UNITED STATES PATENT OFFICE.

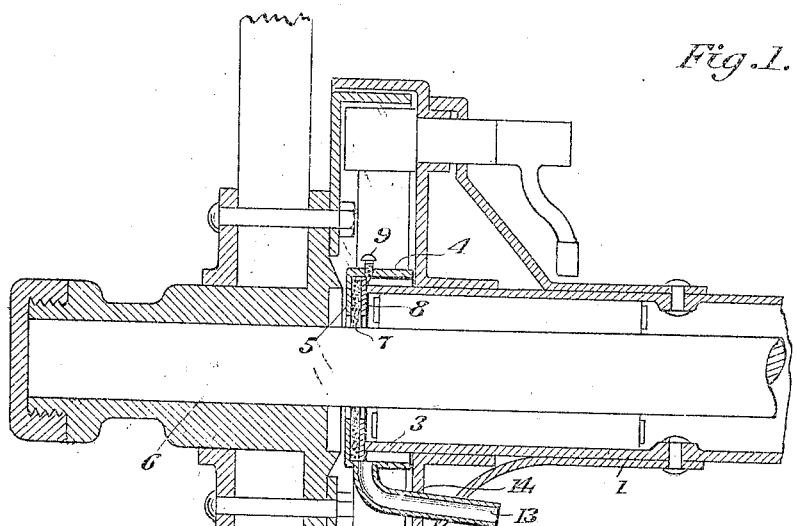
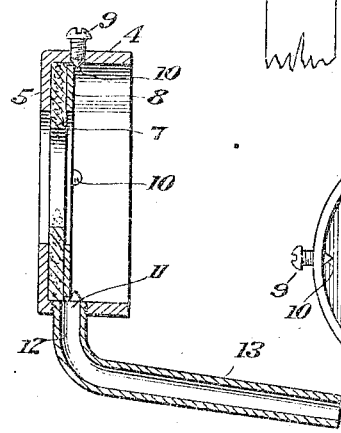
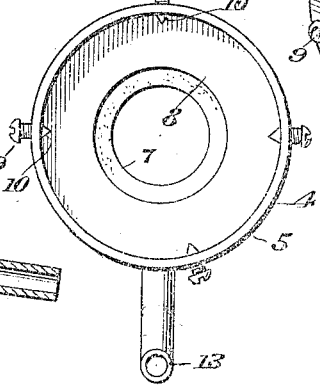
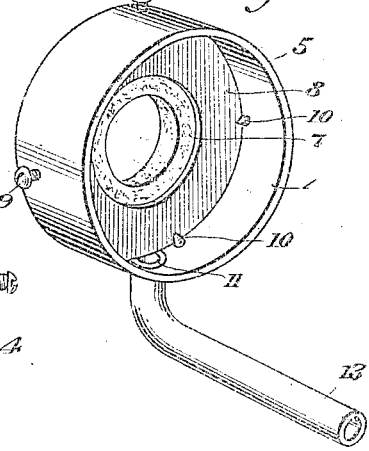

RUFUS H. LIMPP AND URLESS WINELAND, OF KING CITY, MISSOURI.

GREASE-CUP.

1,227,543.

Specification of Letters Patent. Patented May 22, 1917.

Application filed December 20, 1916. Serial No. 138,121.

*To all whom it may concern:*

Be it known that we, RUFUS H. LIMPP and URLESS WINELAND, citizens of the United States, residing at King City, in the county of Gentry and State of Missouri, have invented new and useful Improvements in Grease-Cups, of which the following is a specification.

This invention relates to a device adapted for preventing the grease or lubricant for the rear axle of an automobile leaking out upon the wheels and tires thereof and thus inflicting injury to the said wheel and tires.

In carrying out our invention we propose to provide a cup that is designed to be arranged over the end of the axle housing and which is provided with a compressible washer that surrounds the axle, the said cup being further provided with an outlet spout leading away from the wheels of the vehicle so that all surplus grease can be directed between the rear wheels of the vehicle away from contact with the said wheels.

It is a further object of our invention to produce a device of this character which shall be extremely simple, which may be readily attached to any ordinary construction of automobiles and which shall be thoroughly effective for the purpose designed.

With the above and other objects in view the improvement resides in the construction, combination and arrangement of parts set forth in the following specification and falling within the scope of the appended claims.

In the drawings:

Figure 1 is a view illustrating the application of the improvement,

Fig. 2 is an enlarged central longitudinal sectional view through the same,

Fig. 3 is a perspective view of the improvement,

Fig. 4 is an elevation looking toward the inner face of the improvement.

In the drawing the numeral 1 designates the housing for the rear axle of an automobile, 2 the hub flange which is adapted to receive the hub brake drum and 3 the boss or projection which extends a suitable distance in the hub flange and which forms the end of the housing proper.

The boss 3 is adapted to be surrounded by the flange 4 of a cap 5, the said cap having a central opening through which the axle 6 is adapted to pass. Upon the inner face of the cap 5 we arrange a felt or other compressible gasket 7, and contacting with the said gasket is a metal washer 8. The flange 4 of the cap 5 preferably at points disposed in right angular relation with each other is formed with threaded openings to receive the threaded shanks of headed members 9, the said members being kerfed, whereby to receive the sharpened end of an instrument, such as a screw driver so that the said members may be inserted in the said threaded openings and adjusted for a purpose which will presently be apparent. It is, of course, to be understood that the members 9 may be provided with rectangular or square heads so that they can be readily turned by a wrench or the like. The threaded shanks of the adjustable members 9 have their ends cone-shaped, as at 10, and these cone-shaped ends are adapted to engage with the inner face of the metallic washer 9 to force the same into tight engagement with the compressible gasket 7 or to regulate the pressure between the said washer and the said gasket. The flange 4 at the lower portion of the cap 5 is provided with an opening 11 to receive the angular or branch end 12 of a pipe member 13, the said pipe being preferably arranged at a downward inclination with respect to the longitudinal plane of the axle 6, the said pipe passing through an opening 14 in the hub flange 2.

While we have illustrated the construction as applied to only one end of an automobile, it is to be understood that the same is adapted to be arranged upon both of the sides of the housing for the rear axle of the vehicle, and from the foregoing description the simplicity and advantages of the construction will, it is thought, be perfectly apparent to those skilled in the art to which such invention appertains without further detailed description.

Having thus described the invention, what we claim is:

1. In a device for the purpose set forth, a flanged cap having a central opening, a compressible gasket in the cap and having an opening alining with the opening of the cap, a metallic washer contacting with the gasket, adjustable means upon the flange of the cap and engaging with the washer for regulating the frictional contact of the washer with the gasket, and an outlet spout for the cap.

2. In a device for the purpose set forth, a flanged cap having a central opening in the face thereof, a compressible gasket in the cap, a metallic washer contacting with the gasket, the flange of the cap having threaded openings, threaded elements passing through the openings and having cone-shaped ends engaging with the outer face of the washer, the flange of the cap, at the lower portion thereof being provided with an opening, and an angularly disposed spout connected with the said flange and surrounding the opening.

In testimony whereof we affix our signatures.

RUFUS H. LIMPP.
URLESS WINELAND.